(12) United States Patent
Koenig et al.

(10) Patent No.: US 6,254,350 B1
(45) Date of Patent: Jul. 3, 2001

(54) AUTOMATIC SUB-FLOOR PUMPING SYSTEM

(75) Inventors: Robert H. Koenig, Burdett, NY (US); Richard E. Koenig, Rocheport, MO (US)

(73) Assignee: Avcheck Corporation, Burdett, NY (US)

( * ) Notice: Subject to any disclaimer, the term of this patent is extended or adjusted under 35 U.S.C. 154(b) by 0 days.

(21) Appl. No.: 09/185,141

(22) Filed: Nov. 3, 1998

Related U.S. Application Data

(63) Continuation-in-part of application No. 09/062,845, filed on Apr. 20, 1998, now Pat. No. 5,923,102.

(51) Int. Cl.[7] .............................. F04D 15/00; H01H 35/18
(52) U.S. Cl. ................................. 417/36; 417/41
(58) Field of Search ................... 417/36, 40, 41

(56) References Cited

U.S. PATENT DOCUMENTS

| | | | |
|---|---|---|---|
| 820,429 | 5/1906 | May | 73/304 R |
| 821,623 | 5/1906 | Edison | 141/96 |
| 1,979,127 | 10/1934 | Warrick | 361/209 |
| 3,337,778 | 8/1967 | Becker | 361/142 |
| 3,787,733 | 1/1974 | Peters | 307/118 |
| 3,894,240 | 7/1975 | Rose | 250/577 |
| 3,916,213 | 10/1975 | Luteran | 307/118 |
| 4,061,442 | 12/1977 | Clark | 417/36 |
| 4,182,363 | 1/1980 | Fuller | 137/392 |
| 4,265,262 | * 5/1981 | Hotine | 417/36 |
| 4,600,844 | 7/1986 | Atkins | 307/118 |
| 4,742,244 | 5/1988 | Koerner | 307/118 |
| 5,234,319 | * 8/1993 | Wilder | 417/40 |
| 5,408,223 | 4/1995 | Guillemot | 340/620 |
| 5,923,102 | * 7/1999 | Koenig et al. | 307/118 |

* cited by examiner

*Primary Examiner*—Willis R. Wolfe
(74) *Attorney, Agent, or Firm*—Brown & Michaels, PC

(57) ABSTRACT

Hydrostatic pressure, which builds up from gravity and forces water into a basement through the floor or lower walls, is relieved by sensing the water under the floor and pumping out the water to a drain or area away from the house. Thus, the water is prevented from ever entering the basement, and the basement remains dry. The invention senses and removes water simply by means of tubing and sensing wires inserted through one or more small holes which are easily drilled in an existing basement floor, for example by using an impulse drill with a carbide tipped bit. Both the sensing of the water level and the pumping out of the sub-floor water are accomplished through these small holes drilled through the basement floor in trouble areas, eliminating the need for gutters, channels or sumps.

5 Claims, 6 Drawing Sheets

AUTOMATIC SUB-FLOOR PUMPING SYSTEM

REFERENCE TO RELATED APPLICATIONS

This is a continuation-in-part patent application of a application Ser. No. 09/062,845, filed Apr. 20, 1998, entitled "Automatic Sub-floor Pumping System", now U.S. Pat. No. 5,923,102.

FIELD OF THE INVENTION

The invention pertains to the field of methods and apparatus for removing water from under floors. More particularly, the invention pertains to basement pumping systems for preventing and alleviating water infiltration without the use of sumps, drain gutters, or other relatively large intrusions into the basement floor.

BACKGROUND OF THE INVENTION

Waterproofing and water elimination in basements is a subject of much attention because of the dismay caused by occasional water presence on basement floors. The present invention is the result of diligent and successful work in eliminating periods of water in the basement. In past years there would be surprise and alarm when finding water over the basement floor. Frantic effort would be required to undo the damage.

Conventionally a pump is placed in a well, pit or cavity ("sump") cut into the floor in or below the gravel, rock or mud bed which is found under basement floors. Channel drains on the floor, drainpipes under the floor, or gutters around the base of the basement walls direct water to the sump. The sump pump, usually controlled by a float, pumps the water in the sump out of the basement through an outflow piped away from the house when the water exceeds a predetermined depth.

Sumps take away floor space—a common sump will measure several square feet—and are troublesome to install in existing basements. The conventional float control is prone to problems due to mechanical interference with the float mechanism, thus requiring clear space around the float, especially for a hinged float, which in turn increases the required sump size. Hoses or debris in the water can hold the float under water, preventing it from turning on the pump, or such objects can slip under the float, causing the pump motor to run continuously. Corrosion on the float hinge or slip rod can cause the float to hang up. In addition, the water level is not well controlled by float switches, and the process of floatation requires a certain amount of water to physically support the float sufficiently to activate a switch. In short, float switches are subject to jamming, require much space, and need wide water height variations.

If the basement floor is built on a mud, clay or compressed soil base, the under-floor drainage could be poor enough that even when the water level in the sump is kept low by the sump pump, water will still seep into the basement at other points. If possible, this water may need to be drained into the sump across the floor or through the channels or gutters. In some cases, the water will collect in low spots on the concrete floor during wet periods and cannot be removed at all except by evaporation and a dehumidifier.

Thus, in a conventional sump system, some quantity of water is nearly always present in the basement, either as unpumped water in the sump, or flowing down channels or gutters to the sump, or even as standing surface water in low spots. This increases the humidity in the basement and potentially damages any floor covering which might be present. The sump, gutters and/or collection drains are unsightly, as well.

SUMMARY OF THE INVENTION

In the present invention, the hydrostatic pressure, which builds up from gravity and forces water into the basement through the floor or lower walls, is relieved by sensing the water under the floor and pumping out the water to a drain or area away from the house. Thus, the water is prevented from ever entering the basement, and the basement remains dry.

In this situation, water pressure causes a flow along the interface between the concrete slab of the basement floor and the earth below. In fortunate cases where the slab is laid on a gravel or rock bed, the incoming water fills the void between rocks and tends to seek a uniform level as it accumulates up toward the floor, and a probe system with a single master probe at one location, as described and claimed in the parent application to this continuation-in-part, can serve an entire basement. If the basement floor is laid over packed earth, clay or mud, on the other hand, the water will tend to seep more slowly and unevenly, and more than one probe will be required.

The invention senses and removes water simply by means of tubes (which perform like large soda straws) and sensing wires (together, termed "probes") inserted through one or more holes which are easily drilled in an existing basement floor, for example by using an impulse drill with a carbide tipped bit. Both the sensing of the water level and/or the pumping out of the sub-floor water are accomplished through these small holes drilled through the basement floor in trouble areas, eliminating the need for gutters, channels or sumps. A feature of the invention is that water may be extracted over large areas or along walls by use of multiple probes, arranged in several embodiments, with the use of a single water pump.

DETAILED DESCRIPTION OF THE INVENTION

Ground water travels under the basement floor slab as clear water even though contacting clay or loam soil. The water flows under the floor at the concrete/clay interface because of hydrostatic pressure resulting from the weight of the water. Depending on wetness and soil condition, the water will accumulate and rise around the basement. Relieving the hydrostatic pressure, as accomplished by this invention, eliminates the intrusion in that area.

Figure 1:
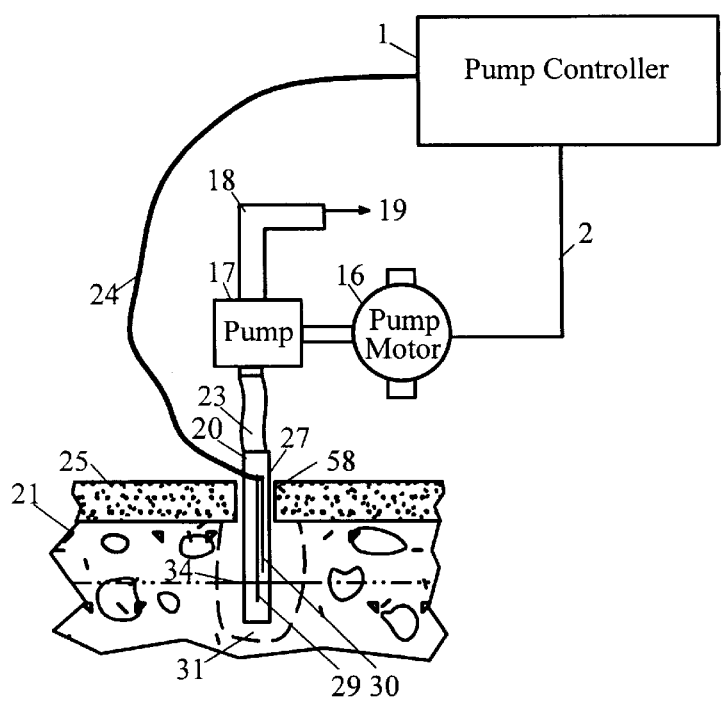
FIG. 1 shows the sub-floor pumping system of the invention in its simplest form, in a basement having a gravel underfloor bed, with a single probe.
Figure 2:
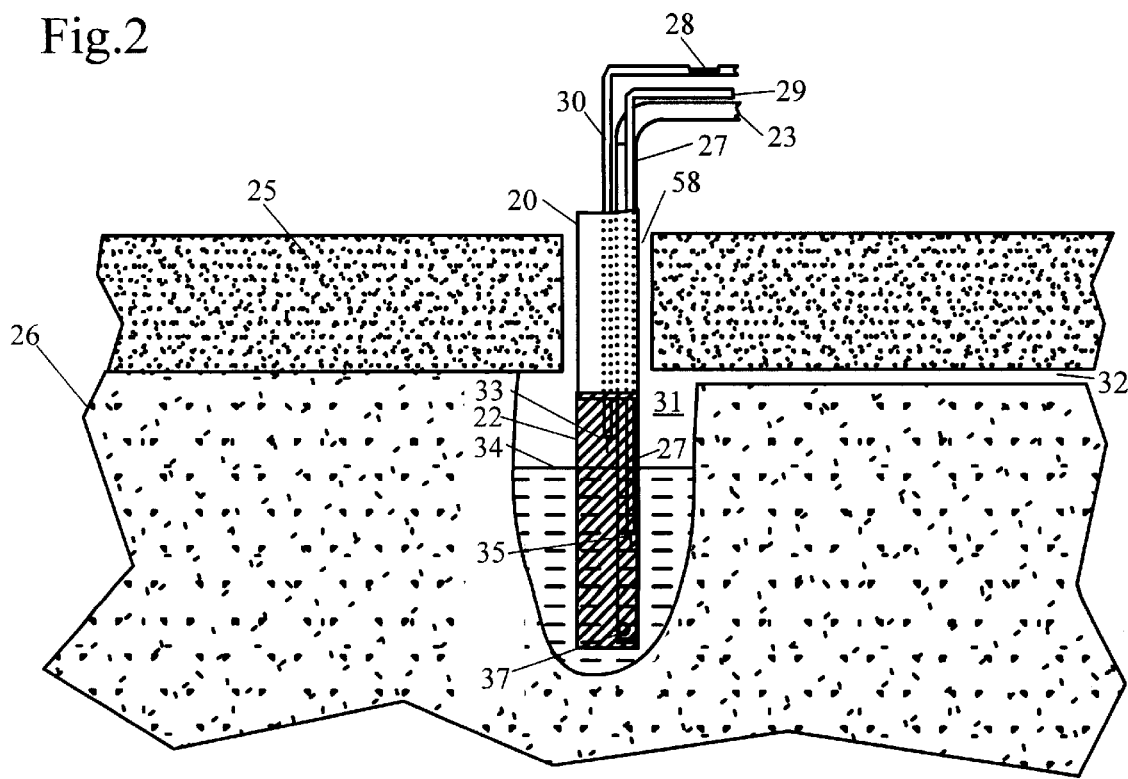
FIG. 2 shows a detail of the master probe and cavity of the sub-floor pumping system of the invention, in a basement having a mud or clay underfloor bed.

Referring to FIGS. 1 and 2, the master sensor/control system of the invention senses the water level in a sub-floor hole or cavity (31) in the gravel (FIG. 1, (21)) or mud/clay (FIG. 2, (26)) using a probe comprising sensor wires (29) (30), a suction tube (27), and optionally a strainer (22) and housing (20). The probe is inserted into the cavity (31) through a small (preferably about 1" diameter) hole (58) drilled and prepared in the basement floor (25). A pump (17), powered by a pump motor (16) is connected by tubing (23) to the suction tube (27). A diaphragm pump, with appropriate strainer, has been found to be ideal, especially for FIG. 2 applications, although other kinds of pumps may be used within the teachings of the invention. Diaphragm pumps are self priming and quiet, but must be used with a strainer of 50 mesh or finer.

Sensor wires (29)(30), extending along the probe into the cavity (31) are connected to an electronic controller (1) which energizes the pump motor (16) when water needs to be removed. There are at least two sensor wires—an upper (30) activating wire, and a lower (29) holding wire. An optional lowest wire may have a tip which is at or below the level of the lower end of the suction tube (27), to act as a ground connection or, preferably, the controller (1) may be grounded electrically to an earth ground or the power system ground. The sensor wires (29) and (30) are preferably adhered to the suction tube (27) to hold them in place at the appropriate depth.

The controller (1) of the invention senses water on the sensor wires in the cavity (31)—when the tip (FIG. 2 (33)) of the top wire (30) is contacted by the rising electrically conductive water (34) in the cavity (31), the pump (17) turns on and water is pumped out through tube (27) until the level falls below the tip (FIG. 2 (35)) of the lower holding wire (29). The pump then shuts off.

The controller and sensing wire arrangement of the invention may be like that disclosed in greater detail and claimed in co-pending parent application, Ser. No. 09/62,845, filed Apr. 20, 1998, and entitled "Automatic Sub-floor Pumping System", which is incorporated here by reference. In all embodiments, the sensors are preferably negative with respect to ground water and thus by the phenomenon of "cathodic protection" corrosion of the sensors is minimized.

Figure 10:
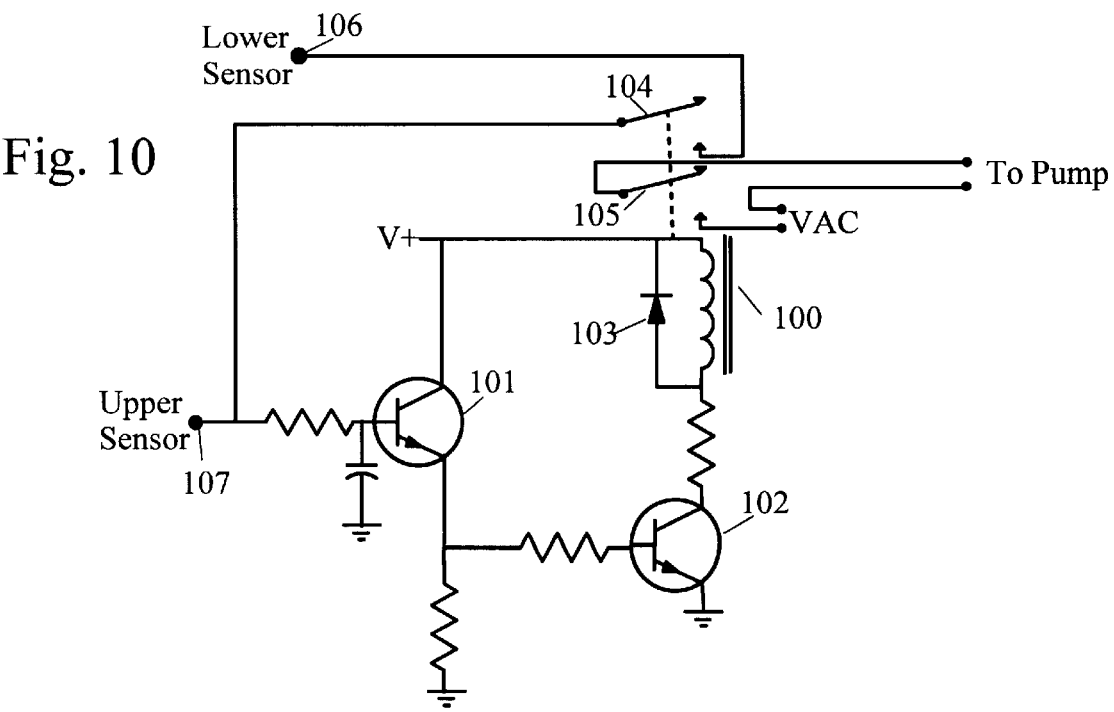
FIG. 10 shows a schematic of a sensor and pump control circuit which may be used with the invention.

Alternatively, the invention may use a simpler controller circuit, as shown in FIG. 10. The control circuit is made up of a pair of NPN transistors, emitter follower (101) and relay driver (102) driving a relay (100) coil. The relay is a double-pole relay, having two sets of normally open contacts (104) and (105). Preferably, a diode (103) is across the relay coil (100). A normally open pair of contacts (105) connects the AC source (VAC) to the pump. The upper (or "trigger") sensor (107) is connected to the base of transistor (101), and the lower (holding) sensor (106) is also connected to the base of transistor (101), through normally open contacts (104). When water contacts the upper sensor, the current flow causes the emitter follower (101) and relay driver (102) transistor pair to activate the relay coil (100) and close contacts (104) and (105). The pump is activated, as VAC is connected to the pump output. Since the lower sensor (106) is now connected to the base of transistor (101) through contacts (104), the relay remains activated until the water has dropped below the lower sensor (106). At that point, relay (100) is deactivated, and contacts (104) and (105) are opened, shutting off the pump and disconnecting lower sensor (106) from the base of transistor (101). The controller will then wait until water once again rises to contact the upper sensor (107).

Preparation of Holes(s)

If the sub-floor (21) is a coarse gravel bed, as shown in FIG. 1, then a simple straight hole, drilled through the basement floor (25) and into the gravel bed (21) will suffice to lower the water level under the entire floor, which is termed the "basic embodiment", below.

In many cases, however, the sub-floor material is not a porous gravel bed, but rather compacted earth, mud or clay, as shown in FIG. 2, (26). This material does not drain as does the gravel, and for optimum water removal operation a modest cavity (31) should be prepared under the hole (58) drilled through the floor slab. During a wet period, water accumulates in the cavity (31) as clear water from passages shown by (32).

The cavity (31) can be enlarged by using a rod or drill inserted through the hole (58) in the floor, digging and loosening the material in the subfloor, and scooping or washing away the loose material. In addition, it has been found useful to inject water under pressure into the holes, which can open flow channels (32) from a cavity (31) to the underground water source. This technique extends the effective range of a given probe and hole. While accomplishing this using a hand operated valve and a pressure gauge, the applied pressure can be seen to drop as a passage breaks through and the flow of water increases. After working in any hole with water, allow at least one half hour to clear before pumping.

Basic Embodiment

FIG. 1 shows the basic form of the invention, wherein a single suction tube (27), with associated sensor wires (29) and (30) work with controller (1) to pump out water from one cavity (31). The co-pending parent application to this application discusses this basic embodiment in greater detail, with emphasis on the controller circuitry.

Multiple Suction Points

Figure 3:
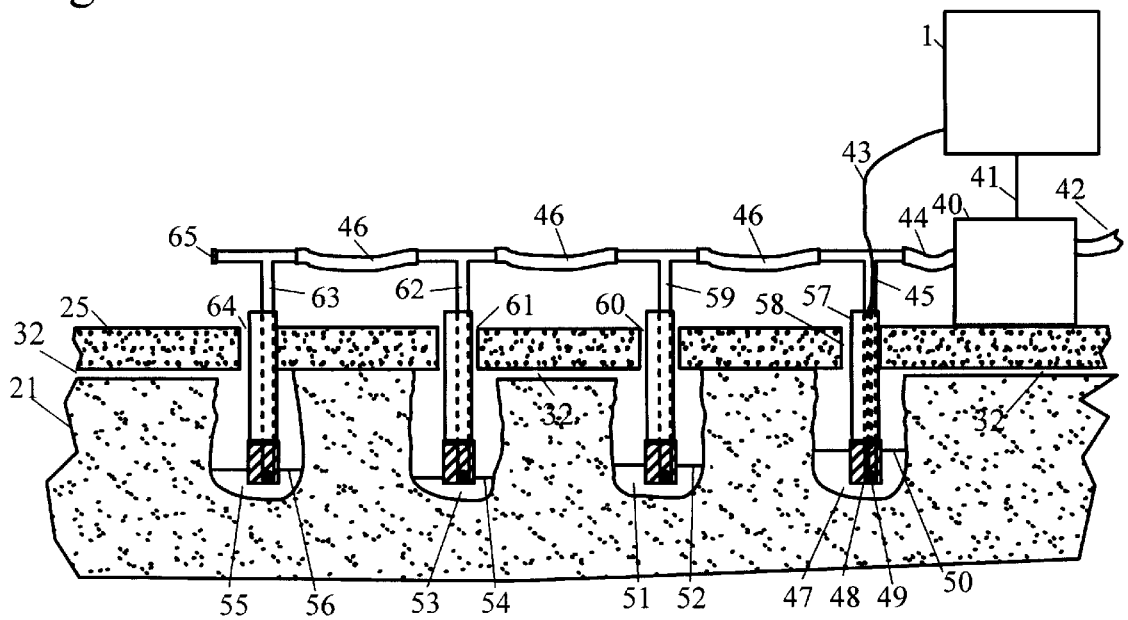
FIG. 3 shows the sub-floor pumping system of the invention, in a basement having a mud or clay underfloor bed, with a master probe and a number of auxiliary probes.

Multiple suction probes can be used with one pump within the teachings of the invention, as shown in FIG. 3. It will be understood that FIG. 3 is not to scale, and compresses the distance between the probes for illustrative purposes, and in actual use a number of holes and probes would be spread out over the area of the basement to be kept dry. Also, FIG. 3 shows four probes, while in actual use the number of probes would vary depending on the water problem and the configuration of the basement.

For basements built on a clay or earth base, multiple holes (58), (60), (61), (64) spaced approximately 12 feet apart, preferably along a wall, may be used to control water intrusion over an extended area. FIG. 3 shows such an arrangement with master probe (45) and auxiliary probes (59)(62)(63).

The master probe (45), preferably enclosed in sleeve (57) and screen (48), is connected to the pump (40) by tubing (44). Additional tubing (46) connects the master probe (45) to the various auxiliary probes (59)(62)(63), either using a "T" fitting at each probe, as shown in FIG. 3, with a cap (65) at the end of the "daisy chain", or by a "hub and spoke" arrangement with separate lines running from each probe to a central point, or some variant on these. Each auxiliary probe (59)(62)(63) is inserted through its own small hole ((60)(61)(64), respectively) in the floor into its own cavity ((51)(53)(55)). The cavities are prepared as described above.

As discussed above, the main probe (445) has sensing electrodes (49), connected through cable (49) to the controller (1) to turn the pump on when the water level (50) in the main cavity (47) reaches an upper activating electrode, and off when the level drops below a lower holding electrode.

The primary or master probe with electronic pump control sensing should be placed in a location where the water is most prevalent—in the cavity where water first appears after a rain. The pump will operate and will drain the master cavity, and the auxiliary cavities will thus be drained before the water level in any of the other cavities rises high enough to leak into the basement.

If a simple suction tube is used for an auxiliary probe, as soon as the probe drains its cavity it will begin to draw air into the probe, and hence into the tubing. This air will be drawn into the pump, and it will not be able to draw water from the master probe or from the auxiliary probes which are still submerged. Thus, the auxiliary probes should be equipped with some method of shutting them off when there is no water to pump from their associated hole.

Probe Design

Experience dictates that probes shown in FIG. 2 should be formed with a right-angle bend at the floor level to permit a low profile (preferably of less than an inch above the floor) for the tubing and wires. For mud-based holes as shown in FIG. 2, suction tube (23) can be ¼" I.D. plastic tubes with sensor wires. For rock-based holes as shown in FIG. 1, the suction tube (23) can be a ½" I.D. plastic tube for a greater flow.

In another useful feature, the upper sensor wire (30) can be exposed at one point (28), to permit testing by touching the exposed wire with a moist finger. This can be done by stripping back the insulation at one point, or by adding a short tinned wire which emerges from the plastic jacket around the wire. Tests can thus be made without the necessity of removing a probe from its hole.

Embodiments Using Auxiliary Probes(s)

The auxiliary probes should thus shut off, at the latest, when their cavity is pumped down below the intake end of the probe, and then re-open to draw water when water is present. This can be done by a number of different methods, such as the embodiments described in more detail below.

An important factor in these embodiments is that the auxiliary probe mechanisms do not, in all but embodiment 4, control the pump—they only serve to shut off the auxiliary probes when insufficient water is present to avoid drawing air into the connecting tubing.

Embodiment 1
Auxiliary Probe with Ball Valve and Float

Figure 4:
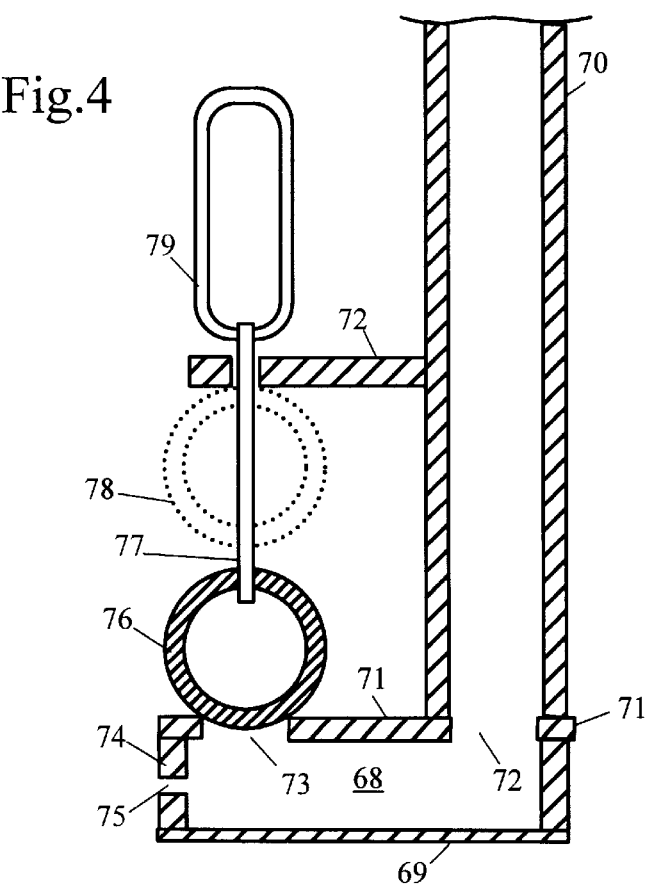
FIG. 4 shows a detail of a first embodiment of an auxiliary probe, having a float-and-ball valve control.

FIG. 4 shows a detail of the lower end of an auxiliary probe incorporating the float and ball valve embodiment of the invention to automatically close off the auxiliary probe before the water level drops below the probe intake. This method is simple, requires no power or active components, and performs adequately, especially if the number of probes is limited to one or two. Many basement situations require no more than this, and indeed some basements require no auxiliary probes. (Basement floors which are wisely built on a rock bed several inches in depth require only one extraction probe to eliminate the water trouble over a total floor area.)

Referring to FIG. 4, the pickup tube (70) of the auxiliary probe is extended horizontally by a chamber (68) which has a closed lower surface (69) and an upper surface (71) with a pair of holes, one (72) communicating with the pickup tube (70), and the other (73) forming a seat for a ball (76) or other closure member (for example, a conical closure member could be used, with the smaller end extending through the hole). The ball (76) is attached to a float (79) by a rod (77), and a guide (72) is provided to keep the float (79) and ball (76) in position over the valve hole (73). The float may be a hollow plastic ball, flattened to fit, or made of foam plastic or cork, or other material as might be desired.

When the water level rises above a preselected depth, the float (79) raises the ball (76) off its seat to an open position (78), and water may be drawn through port hole (73). When the pump starts and draws off water through the hole (73) into the pickup tube (70), the water level drops until the ball (76) once again closes off the valve hole (73). This blocks further flow into the pickup tube, preventing the water level from being drawn so low as to allow air to be drawn into the system.

A relief hole (75) is preferably provided through the chamber wall (74) into the lower chamber (68). The relief hole (75) (which may be as small as 0.040") prevents the ball (76) from being held into the valve hole (73) by low pressure in the chamber (68), which would prevent the float (79) from lifting the ball (76) from the seat.

Embodiment 2
Auxiliary Probe with Vacuum Switch and Solenoid Valve

Figure 5:
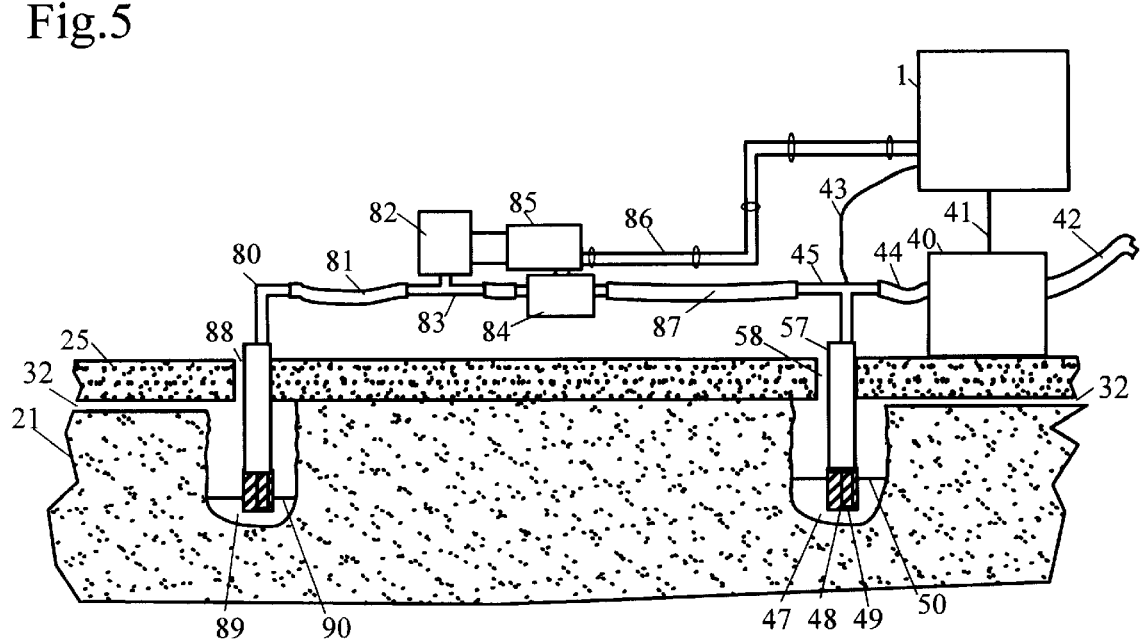
FIG. 5 shows a detail of a second embodiment of an auxiliary probe, having a vacuum switch and solenoid valve control.

FIG. 5 shows an embodiment of the invention in which the flow through the auxiliary probes is electrically controlled by a solenoid valve (84) operated by a valve controller (85) connected to or incorporating a vacuum pressure switch (82), with its pressure sensing input (83) in the line (81) between the auxiliary pickup tube (80) and normally closed shutoff valve (84). The valve (84), in turn, is connected by tubing (87) to the intake line or master probe (45), as shown in FIG. 5, or to the central pickup connection or auxiliary pickup daisy chain, as described above.

The valve controller (85) is connected by wires (86) to the pump controller (1), so that electrical power is applied to the controller (85), and thus the switch (82) when the pump (40) is actuated. The actual voltage supplied by the pump controller (1) would depend on the requirements of the particular valve (84) chosen, but it should be noted that a low-voltage valve would be preferred, so that low-voltage wiring (86) could be used. An Aquatec model E-50 solenoid-operated valve, manufactured by Aquatec Water Systems, Inc., 17422 Pullman St., Irvine, Calif. 926149, can be used, but other types and models of valve would also be applicable.

The pressure switch (82) is a normally open switch, which closes when there is vacuum (i.e. lower than ambient pressure) at the sensing input (83) and is open when the pressure at the sensing input (83) is at or above ambient. When the switch is closed, electrical power is applied to the solenoid of the valve (84), causing it to open and permit flow of water through the line (87).

Figure 7:
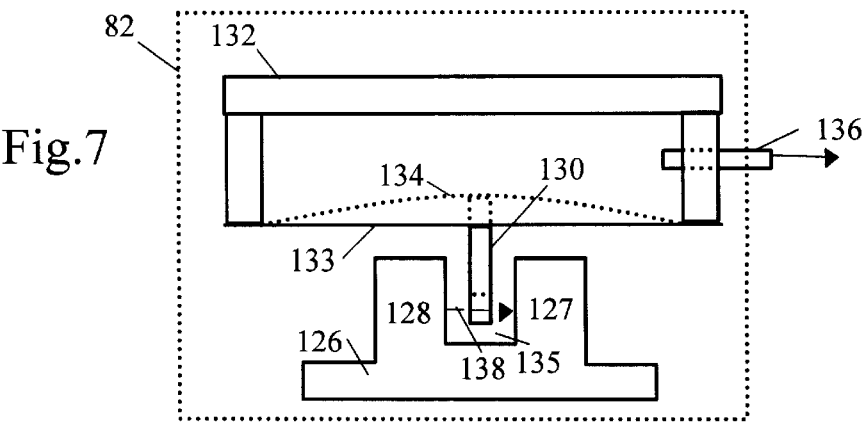
FIG. 7 shows a detail of a vacuum switch for use with the second embodiment of the invention, shown in FIG. 5.

FIG. 7 shows a solid state vacuum switch which may be used with this embodiment of the invention. The sensing input (83) is connected to a chamber (132) having a resilient side forming a diaphragm (133). The diaphragm (133) is made of thin rubber or plastic, and has a vane (130) centrally located, so that when there is a vacuum present at the sensing input (83), the resilient diaphragm (133) is drawn inward to a deflected position (134).

The vane (130) fits in the slot of an optical interrupter (126). A model H21B1 optical interrupter, made by QT Optoelectronics, Inc., 610 N. Mary Ave., Sunnyvale, Calif. 94086-2906, would be an acceptable device, although there are many others from QT or other manufacturers. The optical interrupter has an infrared LED (128) which emits a beam of light (138) through a gap (135) onto a phototransistor (127). Normally, the vane (130) blocks this beam (138), and the switch is "open". When the diaphragm (133) is drawn upward by vacuum (134), vane (130) is drawn out of the way of the beam (138), permitting the light to fall on the phototransistor (127), causing it to conduct or "close the contacts" of the switch. Although this design of switch is desirable, as it has no mechanical parts, other vacuum switches, commercially available, could be used within the teachings of the invention.

In operation, when the pump (40) is running and the water level (90) is above the end of the pickup tube (80) in cavity (89), there is a lower than ambient pressure ("vacuum") present at the sensing input (83) of switch (82). The switch contacts are thus closed, causing electrical power to flow from the controller (1) through wires (86) and switch (82) to the actuating input of valve (84), opening the valve and allowing the water to flow from the auxiliary probe. If the water level (90) drops below the pickup tube, so that air is sucked into the tube (80) and line (81), the vacuum switch (82) opens to de-energize the normally closed valve (84). This prevents air from being drawn into line (87), and permits all other probes to draw water.

It should be noted that when the pump (40) is not in operation or valve (84) is closed, the pressure at the sensing input (83) of the switch (82) would be at ambient (i.e. "no vacuum"), and the switch (82) would thus be open. With the switch (82) open, no power is applied to the valve (84), and the valve remains in its closed position. When the pump (40) is turned on by the controller (1), power appears on wires (86), but because the valve (84) is closed and the sensing input (83) is at ambient pressure, the open switch (82) would prevent the valve (84) from being opened, if a delay was not provided.

Figure 6:
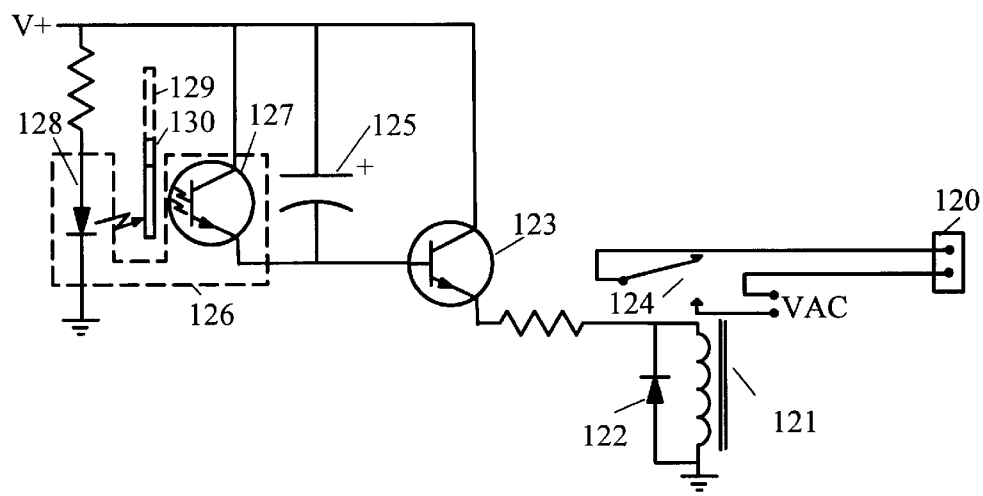
FIG. 6 shows a schematic of a vacuum switch control circuit, for use with the second embodiment of the invention, shown in FIG. 5.

FIG. 6 shows a valve controller circuit ((85) in FIG. 5) which provides a delay when the power is applied, permitting time for the pump to start and develop vacuum before giving effect to the vacuum switch (82). The output of the optical interrupter (126) phototransistor (127) is connected to the base of a relay driver transistor (123). Thus, when the vane (130) is lifted out of the gap, and the light from LED (128) shines on phototransistor (127), relay driver (123) is turned on, and activates relay coil (121). This, in turn, closes contacts (124), connecting the AC current (VAC) to the valve connector (120) (it is assumed here that the valve, as the one specified above, is an AC solenoid, but it will be understood that the relay closure could switch any form of current as might be needed by a specific valve type).

Capacitor (125) provides a delay function, effectively shunting the vacuum switch photo interrupter (126). When the power (V+) is applied by the activation of the pump, capacitor (125) holds the base of transistor (123) positive as it charges, causing the relay (121) to pull in and opening the valve. The pump begins to draw from the probe, either air (no vacuum) or water (vacuum). Once the capacitor is charged, if there is no vacuum present, then the vane (130) will be blocking the light from LED (128) onto phototransistor (127), and the base of transistor (123) will go low, and turn off the relay (121), closing the valve. On the other hand, if there is vacuum (i.e. the probe is drawing water), then the phototransistor (127) will be receiving light and will hold the base of transistor (123) high until the vacuum is gone and the vane drops back to obstruct the light beam and thus close the shut-off valve. The value of capacitor (125) may be chosen to give any delay desired, using conventional circuit design techniques. A delay of approximately 2 seconds has been found to be appropriate, requiring a capacitor (125) of approximately 47 $\mu f$ in the circuit shown in FIG. 6.

If desired, this embodiment of the auxiliary probe could be set up with a vacuum sensor and valve connected to more than one probe, within the teachings of the invention. There could be a single sensor/valve/controller for all of the auxiliary probes, or a number of sensor/valve/controllers, each with one or more associated probes. In such a setup, two or more probes are connected to a central point, or "daisy chained" together, and the central point or chain is connected to a single vacuum sensor and, through the valve, to a suction line. When any of the probes ran dry, the vacuum sensor would close the valve and shut off the suction from all the probes in the group.

Embodiment 3

Auxiliary Probe(s) with Solenoid Valve(s) and Electronic Sensor(s)

Figure 8:
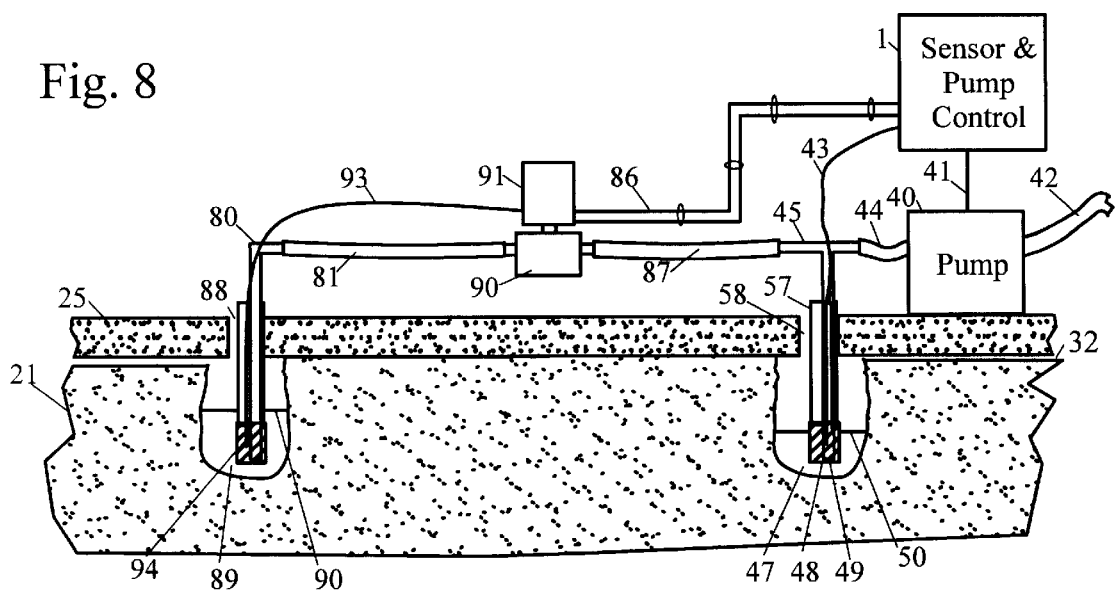
FIG. 8 shows a detail of a third embodiment of an auxiliary probe, having an electronic sensor and solenoid shut-off valve control.

FIG. 8 shows an embodiment of the invention in which the auxiliary probe (80) is fitted with one or two sensor wires (93) having sensing tip(s) (94) located in the auxiliary cavity (89) in the sub-floor.

The sensor wire(s) (93) are connected to a sensor controller (91), which may work like the master controller (1) described in detail in co-pending parent application Ser. No. 09/62,845, incorporated here by reference, or in a simpler form similar to the sensor/pump control discussed above. A schematic of a circuit usable as valve controller (91) is shown in detail in FIG. 9.

The power cable, either from the pump controller or from a separate power supply, is connected to the controller via a connector (111). The power is preferably supplied in the form of low-voltage AC, so that lighter wire may be used within the requirements of the electrical code. The lower (106) and upper (107) sensor wires are connected via another connector (110), and a third connector (109) receives the wires from the valve (90). The negative DC voltage (V−) required to power the electronics in the controller is derived from the AC by a diode (113) and electrolytic capacitor (114).

The control circuit is made up of a pair of transistors, emitter follower (101) and relay driver (102) driving a relay (100) coil. The relay is a double-pole relay, having two sets of normally open contacts (104) and (105). Preferably, a diode (103) is across the relay coil (100). A normally open pair of contacts (105) connects the AC source (VAC) to the valve. The upper (trigger) sensor (107) is connected to the base of transistor (101), and the lower (holding) sensor (106) is also connected to the base of transistor (101), through normally open contacts (104). When water contacts the upper sensor, the current flow causes the emitter follower (101) and relay driver (102) transistor pair to activate the relay coil (100) and close contacts (104) and (105). The valve is opened, as AC voltage (VAC) is applied to the valve connector (109). Since the lower sensor (106) is now connected to the base of transistor (101) through contacts (104), the relay remains activated until the water has dropped below the lower sensor (106). At that point, relay (100) is deactivated, and contacts (104) and (105) are opened, removing energizing voltage from the valve, and disconnecting lower sensor (106) from the base of transistor (101). The controller will then wait until water once again rises to contact the upper sensor (107).

Alternatively, the sensor controller could be a simple conductivity detector, detecting conductivity between a single wire and ground when the wire is submerged in water. If one sensor wire is used, as explained in the parent application to this continuation-in-part, the valve would tend to cycle rapidly as the water level drops close to the bottom of the sensor wire. A capacitor could be used in the circuit to give a hysteresis action, and minimize the rapid-cycling effect of using a single wire.

Embodiment 4
All Probes are Master Probes

Figure 11:
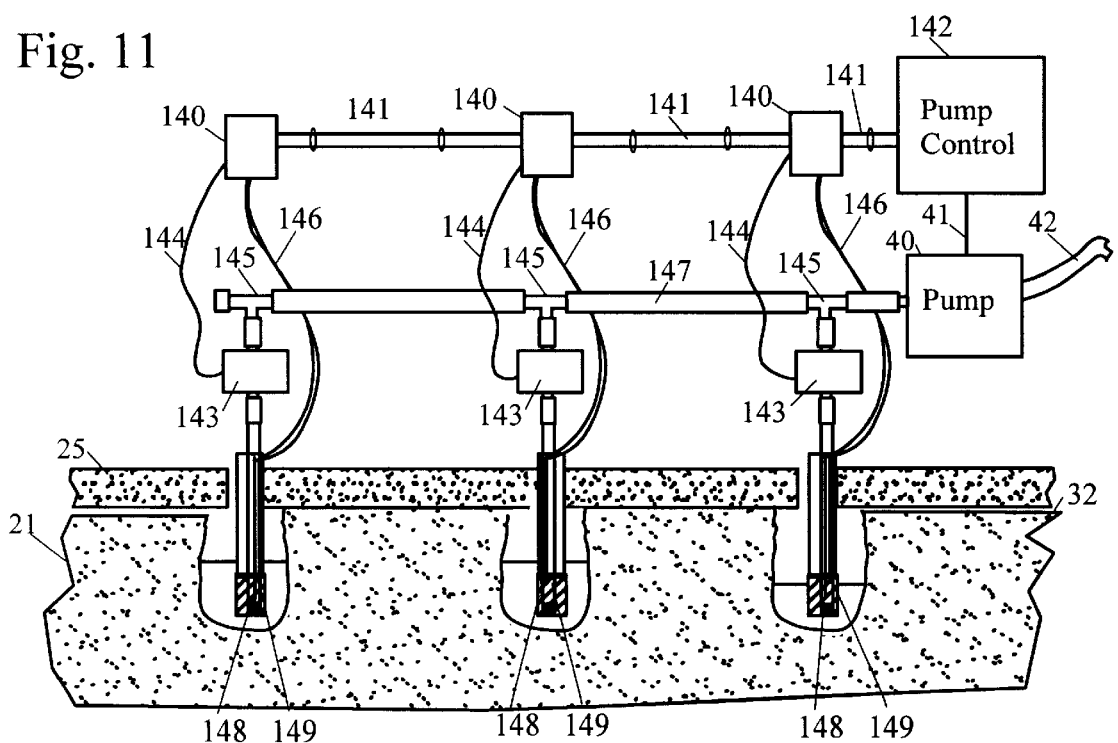
FIG. 11 shows a fourth embodiment of the invention, in which all of the probes are "masters".
Figure 9:
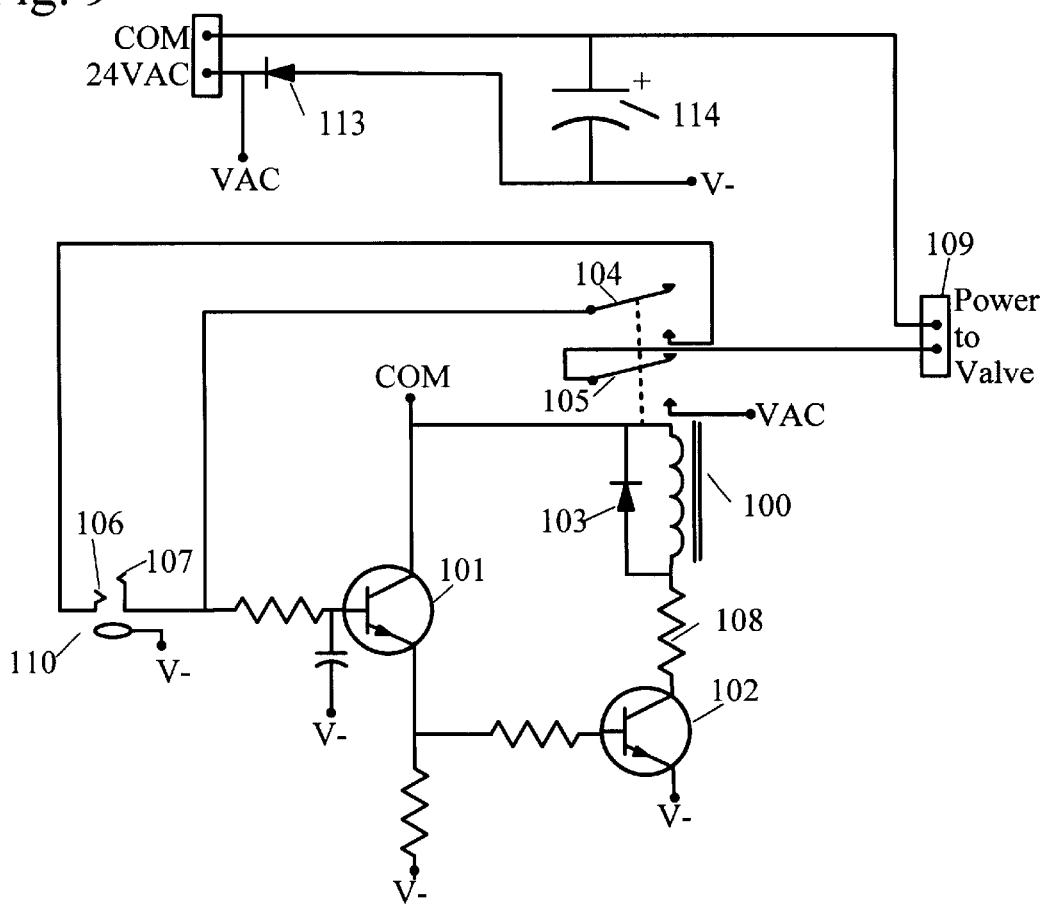
FIG. 9 shows a schematic of a valve control circuit, for use with the third or fourth embodiments of the invention, as shown in FIGS. 8 and 11.

FIG. 11 shows a diagram of another embodiment of the invention, a variation of embodiment 3 in which each of the probes is a "master". The controller circuit (140) of FIG. 9 is used at each of the probes (148), each of which is equipped with two sensors (149) connected via wires (146) to the controller (140). The controllers (140) control valves (143) at each probe via wires (144). All of the probe controllers (140) are powered via power bus wires (141), and all of the valves are connected to a common suction line (147) by "T" connectors (145) or to a central hub, or by connection of tubing from each valve to a multiport manifold at the pump (40). In this embodiment, the pump controller (142) senses current flow on the power bus (141), turning on the pump (40) when it senses that a valve controller (140) has energized open one of the valves (143) in response to the detection of water on a sensor (149). Thus, all of the probes are "masters", in that the pump is turned on by the presence of water in any cavity, not just in the "master" cavity as described in the other embodiments.

Figure 12:
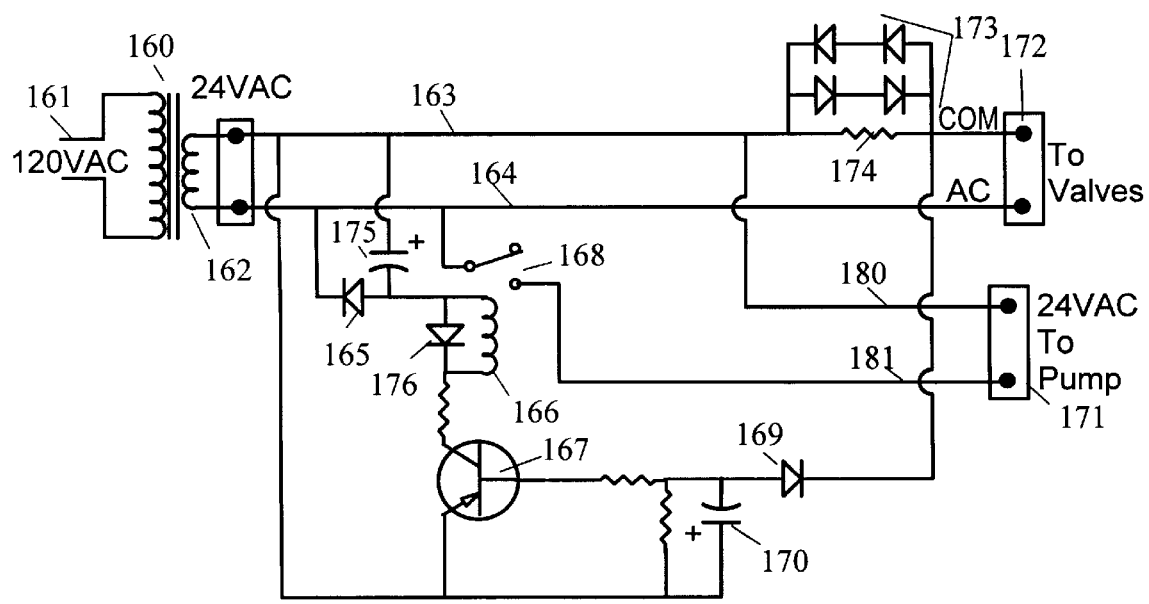
FIG. 12 shows a schematic of a pump control circuit for use with the fourth embodiment of the invention, as shown in FIG. 11.

FIG. 12 shows a schematic of a pump controller ((142) in FIG. 11) for use with the embodiment of FIG. 11. A transformer (160) steps down the line voltage (161) to a lower AC voltage (162) at the secondary, to power the valve controllers ((140) FIG. 11, and the schematic of FIG. 9) through connector (172) and the pump through connector (171). Although 24VAC has been shown in this schematic, it will be understood that with appropriate selection of components, other voltages may be used as well. A diode (165) and electrolytic capacitor (175) rectify the AC supply into DC to power the controller's electronics. A sensing resistor (174) in one of the lines to the valve controllers (172) develops a voltage when current flows through the line. A value of 10 ohms has been found to be effective for sensing resistor (174), although other values can be used depending on circuit requirements. Back-to-back diodes (173) limit this voltage drop to about 1.4 Volts, and the voltage is converted to DC by diode (169), smoothed by electrolytic capacitor (170), and applied to the base of PNP transistor (167). When the negative voltage is applied, transistor (167) conducts and activates the coil (166) of a relay, closing normally open contacts (168) and applying activating power to the pump connector (171). Thus, if water is sensed at any cavity, its associated valve is opened, and the current drawn by the valve turns on the pump.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method of removing water from a basement having a basement floor laid over sub-floor material, using a pump having a suction input connected to a suction hose and a drain output connected to an outflow, the pump, when activated, pumping fluid from the suction hose and exhausting the fluid to the outflow, the method comprising the steps of:
   a) connecting a plurality of pickup tubes, each having an open lower end, to the suction hose;
   b) providing a plurality of holes extending from the basement through the basement floor, each hole being of sufficient size to permit a pickup tube to pass therethrough;
   c) preparing a cavity under each of the holes;
   d) inserting the lower end of a pickup tube through each of the holes into the cavity under the hole;
   e) providing a water level sensor in at least one cavity, above the lower end of the pickup tube;
   f) activating the pump when the water level sensor detects the presence of water;
   g) providing a water sensor located on at least one of the pickup tubes above the lower end thereof,
   h) providing a valve in the suction hose leading to the pickup tube provided in step g, and
   i) providing a sensor controller connected to the sensor provided in step g and the valve provided in step h, such that the valve is open when the sensor controller detects the presence of water at the water sensor.

2. A method of removing water from a basement having a basement floor laid over sub-floor material, using a pump having a suction input connected to a suction hose and a drain output connected to an outflow, the pump, when activated, pumping fluid from the suction hose and exhausting the fluid to the outflow, the method comprising the steps of:
   a) connecting a plurality of pickup tubes each having an open lower end to the suction hose;
   b) providing a plurality of holes extending from the basement through the basement floor, each hole being of sufficient size to permit a pickup tube to pass therethrough;
   c) preparing a cavity under each of the holes;
   d) inserting the lower end of each pickup tube through a hole into a cavity;
   e) providing a water level sensor in at least one cavity, above the lower end of the pickup tube;
   f) providing a valve in the suction hose leading to each of the pickup tubes;
   g) providing a sensor controller connected to the sensor and the valve, such that the valve is open when the sensor controller detects the presence of water at the water sensor, and
   h) activating the pump when any of the water sensors detects the presence of water.

3. An automatic sub-floor pumping system for removing water from a basement having a basement floor laid over sub-floor material comprising:
   a) a pump having a power input a suction input and a drain output such that when power is applied to the power input the pump is activated and fluid is pumped from the suction input and exhausted to the drain output;
   b) a pump controller having a power output coupled to the power input of the pump and a sensor input, such that when current flow is detected on the sensor input, power is applied to the power output and the pump is activated;

c) a plurality of pickup tubes, each having an open lower end, connected to the suction input of the pump through a suction hose, the lower end of the pickup tube capable of being inserted through the basement floor into a cavity in the sub-floor through a hole in said floor, the hole being of sufficient size to permit the pickup tube to pass there through;

d) a water level sensor attached to at least one pickup tube, above the lower end of the pickup tube, connected to the sensor input of the pump controller, such that current flows when the water level sensor detects the presence of water above the lower end of the pickup tube and the pump is activated by the pump controller, applying suction to the pickup tube from the suction input of the pump and pumping the water from the cavity through the pickup tube and exhausting the water to a drain from the drain output of the pump;

e) a secondary water sensor located on at least one of the pickup tubes above the lower end thereof;

f) valve in the suction hose leading to a pickup tube having a secondary water sensor, and g) a sensor controller connected to the secondary sensor and the valve, such that the valve is open when the sensor controller detects the presence of water at the secondary water sensor.

4. An automatic sub-floor pumping system for removing water from a basement having a basement floor laid over sub-floor material, comprising:

a) a pump having a power input, a suction input and a drain output, such that when power is applied to the power input, the pump is activated and fluid is pumped from the suction input and exhausted to the drain output;

b) a pump controller having a power output coupled to the power input of the pump and a sensor input, such that when current flow is detected on the sensor input, power is applied to the power output and the pump is activated;

c) a plurality of pickup tubes, each having an open lower end, connected to the suction input of the pump through a suction hose, the lower end of the pickup tube capable of being inserted through the basement floor into a cavity in the sub-floor through a hole in said floor, the hole being of sufficient size to permit the pickup tube to pass therethrough;

d) a water level sensor attached to each pickup tube, above the lower end of the pickup tube;

e) a normally closed valve coupled to each of the pickup tubes, having a fluid input connected to the pickup tube and a fluid output connected to the suction hose, and an actuating input;

f) a sensor controller coupled to each of the water level sensors, having a power input connected to the sensor input of the pump controller and an actuating output connected to the actuating input of the valve, such that the valve is open when the sensor controller detects the presence of water at the water sensor, causing the valve to draw current from the sensing input of the pump controller, causing the pump controller to activate the pump, such that the pump is activated when any of the water sensors detects the presence of water.

5. The automatic sub-floor pumping system of claim 3, in which the pump is a diaphragm pump.

* * * * *